United States Patent [19]
Raab et al.

[11] Patent Number: 6,131,299
[45] Date of Patent: Oct. 17, 2000

[54] DISPLAY DEVICE FOR A COORDINATE MEASUREMENT MACHINE

[75] Inventors: Simon Raab, Maitland; John Bodjack, Lake Mary, both of Fla.

[73] Assignee: Faro Technologies, Inc., Lake Mary, Fla.

[21] Appl. No.: 09/108,290

[22] Filed: Jul. 1, 1998

[51] Int. Cl.[7] .......................... G01B 5/004; G01B 5/008
[52] U.S. Cl. ................... 33/503; 33/504; 33/558
[58] Field of Search .............. 33/503, 504, 505, 33/556, 558, 559, 561, 1 M; 702/94, 95, 150, 151, 152, 153, 155, 156, 167, 168, 169, FOR 144, FOR 145, FOR 149

[56] References Cited

U.S. PATENT DOCUMENTS

| | | | |
|---|---|---|---|
| 5,148,377 | 9/1992 | Mcdonald | 33/503 |
| 5,402,582 | 4/1995 | Raab | 33/503 |
| 5,412,880 | 5/1995 | Raab | 33/504 |
| 5,428,548 | 6/1995 | Pilborough et al. | 33/504 |
| 5,517,190 | 5/1996 | Gunn | 33/561 |
| 5,611,147 | 3/1997 | Raab | 33/503 |
| 5,633,660 | 5/1997 | Hansen et al. | 345/173 |

FOREIGN PATENT DOCUMENTS

| | | |
|---|---|---|
| 0841532A1 | 5/1998 | European Pat. Off. |
| 2275339 | 8/1994 | United Kingdom . |
| WO94/24514 | 10/1994 | WIPO . |
| WO95-02801 | 1/1995 | WIPO . |
| WO97/06410 | 2/1997 | WIPO . |

*Primary Examiner*—Diego Gutierrez
*Assistant Examiner*—Faye Francis
*Attorney, Agent, or Firm*—Cantor Colburn LLP

[57] ABSTRACT

A novel display device for use with a three dimensional coordinate measurement system provides a Display positioned on a multijointed measuring arm allowing an operator to have convenient display of positional data and system menu prompts. The display device further includes LED's indicating system power, transducer position status and error status. An embodiment of the present invention receives signals from a host computer via telemetry allowing the display to be positioned remote from the system.

11 Claims, 2 Drawing Sheets

DISPLAY DEVICE FOR A COORDINATE MEASUREMENT MACHINE

FIELD OF INVENTION

This invention relates generally to three dimensional coordinate measuring machines (or CMM's). More particularly, this invention relates to a new and improved display for a three dimensional CMM which provides improved accuracy and ease of use.

BACKGROUND OF INVENTION

It is well known in the art to utilize a CMM to measure objects in a space in terms of their X, Y, and Z coordinates commonly referring to length, width and height. Advancement in the art has led to lightweight portable CMM's well suited for general industrial applications. Such a CMM is disclosed in U.S. Pat. No. 5,402,582 which is commonly assigned to the assignee hereof and incorporated herein by reference. Three dimensional objects are described in terms of position and orientation; that is, not just where an object is but in what direction it points. The orientation of an object in space can be defined by the position of three points on the object. Orientation can also be described by the angles of alignment of the object in space. The X, Y, and Z coordinates can be most simply measured by three linear scales. In other words, if you lay a scale along the length, width and height of a space, you can measure the position of a point in the space.

Presently, coordinate measurement machines or CMM's measure objects in a space using three linear scales. Coordinate measuring machines of the prior art comprise a multijointed (preferably six joints) manually positional measuring arm for accurately and easily measuring a volume which typically comprises a sphere preferably ranging from six to eight feet in diameter (but which may also cover diameters more or less than this range). In addition to the measuring arm CMM's of the prior art employ a controller (or serial box) which acts as the electronic interface between the arm and a host computer which displays menu prompts and outputs to an operator. The mechanical measuring arm used in CMM's generally comprise a plurality of transfer housings (with each transfer housing comprising a joint and defining one degree of rotational freedom) and extension members attached to each other with adjacent transfer housings being disposed at right angles to define a movable arm preferably having five or six degrees of freedom. Each transfer housing includes measurement transducers. In addition, each transfer casing includes visual and audio endstop indicators to protect against mechanical overload due to mechanical stressing.

The use of a discrete microprocessor-based controller box permits preprocessing of specific calculations without host level processing requirements. This is accomplished by mounting an intelligent preprocessor in the controller box which provides programmable adaptability and compatibility with a variety of external hosts (e.g., external computers). The serial box also provides intelligent multi-protocol evaluation and auto switching by sensing communication requirements from the host. For example, a host computer running software from one manufacturer will generate call requests of one form which are automatically sensed by the controller box. Still other features of the controller box include serial port communications for standardized long distance communications in a variety of industrial environments and analog-to-digital/digital counter boards for simultaneous capture of encoder data from all of the transfer housing resulting in highly accurate measurements.

CMM's of the prior art include transducers (e.g., one transducer for each degree of freedom) which gather rotational positioning data and forward this basic data to a serial box. The serial box provides certain preliminary data manipulations. In a typical configuration the serial box is positioned under the host computer somewhat remotely from the probe and of the arm. The serial box includes EE-PROMS which contain data handling software, a microcomputer processor, a signal processing board and a number of indicator lights and audio output, usually in the form of a speaker. As mentioned, basic transducer data is sent from the arm to serial box where the serial box then processes the raw transducer data on an ongoing basis and responds to the queries of the host computer with the desired three dimensional positional or orientational information.

Presently CMM systems require that the operator, while manipulating the arm, refer back to the display screen of the host computer and respond to alphanumeric messages displayed thereon or respond to audio signals. The messages and audio signals are generated by the host computer and applications software. In certain cases the components of the CMM system (e.g., the arm, serial box and host computer with display) are arranged in positions which are often difficult or inconvenient for the operator to see or hear.

Measurement arms for CMM's include a probe handle at the operator end. Probe handles of the prior art are held by an operator as either a pencil or pistol grip and sometimes possess two switches for the attachment of optional electronics and/or a threaded mount for receiving a variety of probes. Because the CMM is a manual measurement device, the user must be capable of taking a measurement and then confirming to CMM whether the measurement is acceptable or not. This is typically accomplished through the use of the two switches. One switch is used to trap the 3 dimensional data information and the second switch confirms its acceptance and transmits it to the host computer. A number of voltage lines and analog-to-digital converter lines are routed from the serial box through the arm to the probe handle for general attachment to a number of options such as a laser scanning device or touch probe. The switches are also used to respond to menu prompts, either displayed or audio signals, from the host computer.

A variety of probes may be threaded to a probe handle assembly such as a hard ¼ inch diameter ball probe or a point probe is shown. The probes are typically threadably mounted to mount which in turn, is threadably mounted to a probe housing and may also include a plurality of flat surfaces for facilitating engagement and disengagement of the probes using a wrench.

The front panel of a serial box of the prior art has eight lights including power indicator light and error condition light and six other lights corresponding to each of the six transducers located in each transfer housing. Upon powering up, the power light will indicate power to the arm. The six transducer lights indicate the status of each of the six transducers.

The status lights may indicate, for example, if any of the transducers approach its rotational endstop from within 2 degrees, the light, and an audible beep, for that particular transducer indicates to the user that the user is too close to the end stop; and that the orientation of the arm should be readjusted for the current measurement. The serial box will continue to measure but will not permit the trapping of the data until such endstop condition is removed. A typical situation where this endstop feature is necessary is the loss of a degree of freedom by the rotation of a particular transducer to its endstop limit and, hence, the applications of forces on the arm causing unmeasured deflections and inaccuracies in the measurement.

At any time during the measurement process, a variety of communication and calculation errors may occur. These are communicated to the user by a flashing of the error light and then a combination of lights of the six transducers indicating by code the particular error condition. Some serial box front panels utilize an alphanumeric LCD panel giving alphanumeric error and endstop warnings.

SUMMARY OF THE INVENTION

The above discussed and other drawbacks and deficiencies of the prior art are overcome or alleviated by the present invention. In accordance with the present invention a novel display device for use with a three dimensional coordinate measuring machine (CMM). The display device is positionable near the probe handle end of the arm of a CMM to display transmission from the microprocessor in a convenient visual and audio format for an operator. An embodiment of the present invention includes a liquid crystal display (LCD), a speaker and a plurality of light emitting diodes (LED's). The LCD displays coordinate information relative to the measuring probe within a defined workspace and further provides alphanumeric information in the form of system driven menu prompts. The display provides information to an operator pertaining to the arm transducer status, error signals and power status. The speaker provides audio information indicating system conditions, errors or operator prompts. The display device of the present invention also includes a headphone jack for permitting the use of headphones in situations where the speaker is less than optimal.

The display device is mountable at various positions along the arm of a CMM and comprises a wrist component mount which permits rotation of the display for operator viewing. In an embodiment the display device comprises a magnetic base to provide rotational positioning within the mount. In another embodiment the host computer transmits information to the display device via telemetry which allows the display device to be positioned remote from the arm.

The display device of the present invention displays system driven menu prompts which an operator responds to using the trap and accept buttons of the prior art. An embodiment of the present invention includes an option port for receiving a menu selection device, mouse, or keyboard for interacting with the microprocessor.

The above discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE PREFERRED EMBODIMENT

Figure 1:
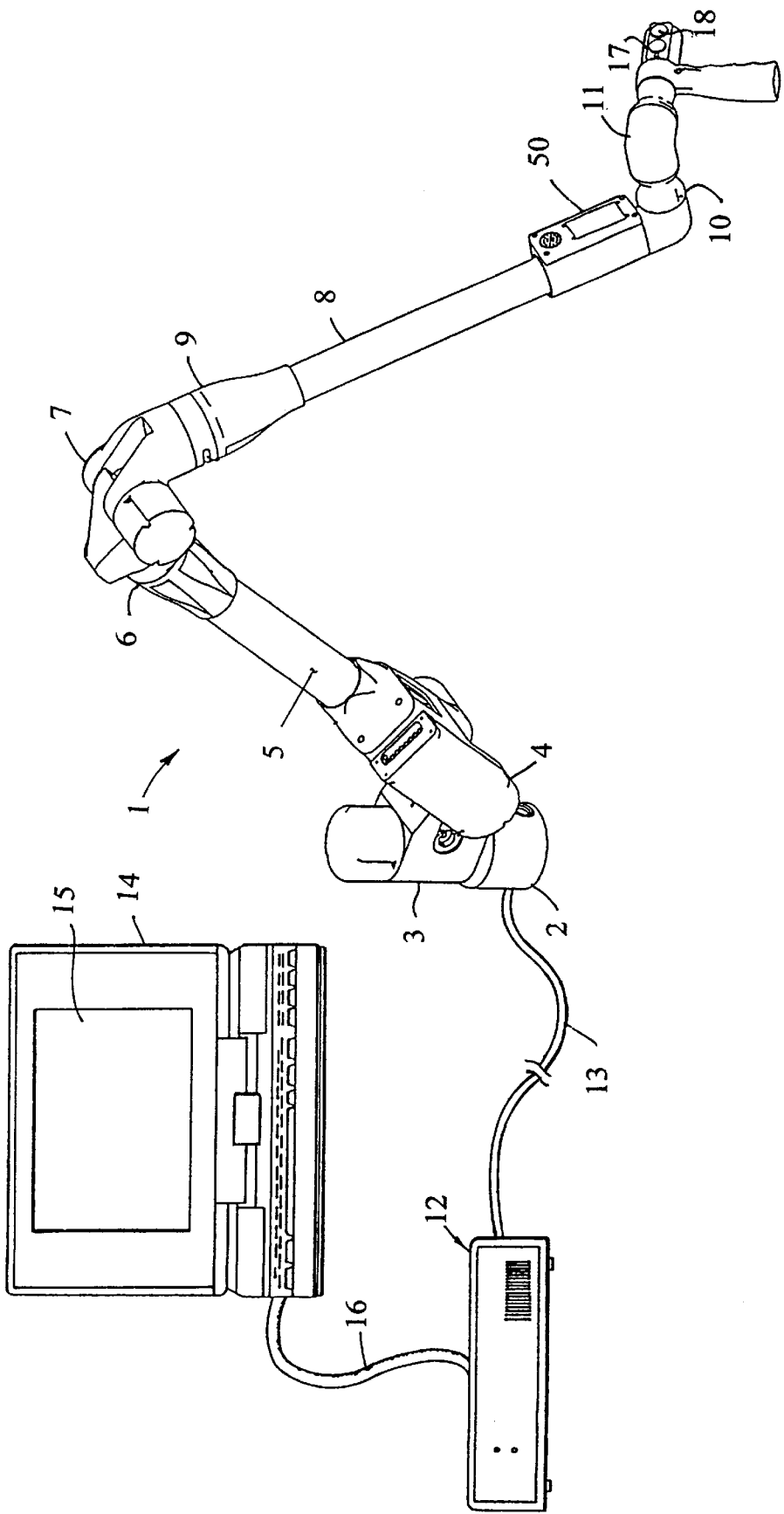
FIG. 1 is an isometric view of a three dimension coordinate measurement system incorporating a display device of the present invention.

Referring to FIG. 1 a multi jointed manually operated arm for use with a coordinate measuring machine (CMM) is shown generally as 1. In general terms, arm I is comprised of a base 2 connected to a first set of transfer housings 3, 4, a first extension member 5 rigidly attached to the first set of transfer housings and a second set of transfer housings 6, 7 and a third set of transfer housings 9, 10 disposed between a second extension 8 with transfer housing 9 attached to transfer housing 7. The sets of transfer housings are generally pairs of rotatable joints positioned transverse to one another and, as in the prior art, have position sensing transducers disposed therein (not shown). Mounted at the end of arm I and extending from transfer housing 10 is probe handle assembly 11 including data switch buttons 17, 18. As in the prior art arm 1 electrically communicates with serial box 12 via cable 13 which communicates with electronically with host computer 14 having display 15 via cable 16.

In accordance with the present invention, the embodiment of FIG. 1 shows, by way of example, display device 50 disposed on arm 1 near probe handle assembly 11 in the vicinity of an operator (not shown) manipulating the arm. In fact, display 50 may be positioned at any one of several points along arm 1 convenient to the operator and as described herein below. Display 50 comprises many of the features of the serial box and host of prior art CMM systems as described herein above and details of display 50 are more readily described with reference to FIG. 2. By way of example display 50 includes text screen 51 comprised of an LCD as is known for visually displaying dimensional data and prompts to an operator. Display 50 further comprises LED's 52–57 which correspond to the six transducers in transfer housings 3, 4, 6, 7, 9, 10 to indicate the status of each of the transducers. In addition display 50 comprises warning LED 58 which, for example, lights when a transfer housing is approaching a stop during movement of arm 1 and also includes power indicating LED 59 which indicates that power is being transmitted to the arm. Display 50 further includes audio speaker 61 and head phone jack 61 for transmitting audio signals from the serial box 12 and host computer 14 to an operator. Head phone jack 61 enables an operator to hear and respond to audio signals from the host computer while operating in a noisy environment. In the embodiment shown in FIG. 1 electronic communication is transmitted from host computer 14 and serial box 12 to arm 1 via cables 13, 16 and within arm 1 to display 50 via internal cables as is known.

Figures 2, 3:
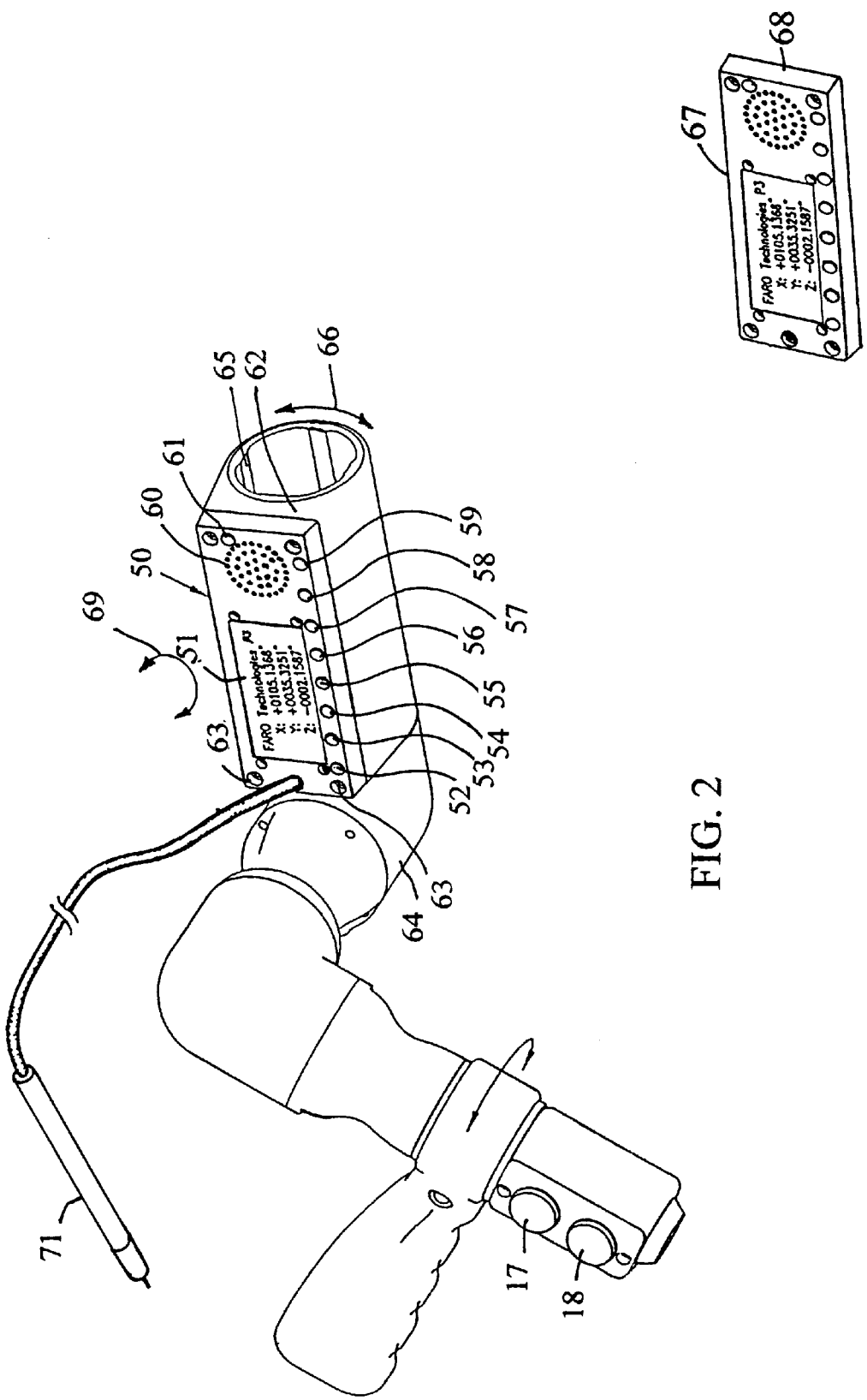
FIG. 2 is an isometric view of a handle probe assembly and a display device of the present invention.
FIG. 3 is an isometric view of a display device showing a magnetic base.

Referring to FIG. 2 display 50 is disposed on base mount 62 by screws 63. Base mount 62 is disposed on wrist component 64 and axial secured and secured in a limited rotational path by a ball and detent arrangement (not shown) as is known. Wrist component 64, and therefore display 50, are removably secured to extension 8 by twist and lock grooves 65 engaged with matching splines (not shown) on the extension as is known. With display 50 mounted as described an operator manipulating arm 1 via handle assembly 11 can rotate display 50 in the directions represented by arrow 66 to provide a convenient perspective to the display.

An alternative embodiment of the present invention is described with reference to FIG. 3 wherein telemetric display 67 includes magnet base 68 mounted to the backside thereof. Telemetric display 67 functions similar to that described herein above but transmits and receives electronic communications between serial box 12 and host computer 14 via telemetry as is known. Magnetic base 68 allows display 67 to mounted to any suitable surface convenient to an operator. For instance display 67 can be temporarily mounted to a ferrous workpiece or other convenient ferrous surface to provide close inspection to the operator. In another embodiment, base mount 62 comprises a ferrous surface allowing for the removable mounting of display 67. The advantage of this embodiment is that display 67 may be rotated in the direction indicated by arrow 69 to accommodated certain uses or manipulations of arm 1 to provide a convenient perspective to an operator or removed and applied to a wall or workpiece as described above. In yet another embodiment telemetric display 67 comprises a base mounting adaptable for a hook and loop type temporary fastening system as is known. In another embodiment display 67 comprises a spring clip type fastener as is known for temporary installation on a variety of surfaces.

In operation, the present invention permits the physical positioning of the display convenient to an operator in situations where the display and serial box of the prior art may be less than optimal. Upon start up of the CMM system an operator is given convenient access to both visual and audio information about the system such as power to the arm 1 via LED 59 and the status of the transducers via LED's 52–57. During manipulation of arm 1 to inspect a workpiece the operator receives prompts from serial box 12 and host 14 in the form of audio signals via speaker 60 and alphanumeric characters displayed on screen 51. The operator may respond to the prompts by pressing buttons 17, 18. In an alternative embodiment an operator display screen 51 comprises a touch screen as is known to allow the operator to respond to a simple set of menu selections transmitted from the host computer by touching the surface of the screen. In the embodiment shown in FIG. 2 display 50 includes an option port 70 receiving, for example, menu selection tool 71. Alternatively option port 70 may receive a communication link from a key board or other input or output device.

During use of a CMM incorporating a display in accordance with the present invention the serial box 12 first undergoes self checking procedures and supplies power of arm1 as in the prior art. The microprocessor resident in serial box 12 sends a signal to display 50 lighting LED 59 indicating to the operator that the arm has power and lighting LED's 52–57 indicating that the transducers have not been calibrated as in the prior art. Error LED 58 would also be illuminated. The operator, through manipulation of arm 1, causes the arm to pass through the preselect reference locations and as each transducer is referenced the corresponding LED is extinguished until all LED's 52–57 are extinguished as well as error LED 58. The display 50 of the present invention with its position [roximal the operator gives instant and convenient indication. Once all the transducers have been referenced the system establishes electronic communication with the host and awaits further communication from the operator. Typically the operator depresses button 17 or 18 to initiate the measurement process. Once the measurement process has begun dimensional coordinates of the probe end are displayed on text screen 51. The LCD of text screen 51 is capable of displaying measurement coordinates in the coordinate system of the workpiece through feedback from the application software of the host computer. The operator is able to visually receive the coordinates of the probe on text screen 51 as arm 1 is manipulated about the workpiece within the working volume of the CMM.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An alphanumeric display device mounted on a movable arm of a three dimensional coordinate measuring system, said movable arm having a probe end and including a plurality of joints with each joint corresponding to a degree of freedom such that the arm is moveable within a selected volume, each of the joints comprises a rotational transfer housing having a positional transducer disposed therein producing a signal corresponding to a position, the system further having a microprocessor receiving the position signals and providing a digital coordinate corresponding to the position of the probe in the selected volume, the alphanumeric display device receiving the digital coordinate and displaying the coordinate.

2. The display device as set forth in claim 1 wherein the display is disposed on the arm proximal the probe end.

3. The display device as set forth in claim 1 wherein system provides electrical power to the arm and further provides an electrical signal indicative thereof, a plurality of electrical signals corresponding to transducer status, and an electrical signal corresponding to a system error status, the display device further comprising a plurality of light emitting diodes receiving the electrical signals.

4. The display device as set forth in claim 1 wherein the system provides an audio signal, the display further comprising a speaker receiving the audio signal and producing a noise in response thereto.

5. The display device as set forth in claim 1 wherein the display device comprises a liquid crystal display.

6. The display device as set forth in claim 1 wherein the arm comprises a plurality of extensions disposed between selected transfer housings and the display farther comprises:

a wrist component removably secured to one of the extensions and one of the transfer housings;

a display housing rotatbly disposed on the wrist component; and the display removably secured within the housing.

7. The display device as set forth in claim 6 wherein the display is secured within the housing by a plurality of fasteners.

8. The display device as set forth in claim 6 wherein the display is disposed within a bezel having a magnetic base and the based is magnetically secured within the housing in a plurality of positions.

9. The display device as set forth in claim 1 wherein the microprocessor provides signals corresponding to operator instruction selections, the Display receiving the signals and displaying the selections, the Display further comprising a touch screen providing a signal to the microprocessor corresponding to an operator response.

10. The display device as set forth in claim 1 further comprising an option port permitting electrical communication between the microprocessor and a menu selection tool or a keyboard.

11. The display device as set forth in claim 1 wherein the microprocessor transmits the digital coordinates and the display device receives the coordinates via telemetry.

* * * * *